United States Patent [19]

Solomon

[11] Patent Number: 4,472,463
[45] Date of Patent: Sep. 18, 1984

[54] TWO-STEP PROCESS FOR DIPPING TEXTILE CORD OR FABRIC AND RESORCINOL/FORMALDEHYDE-FREE COMPOSITION USED THEREIN

[75] Inventor: Thomas S. Solomon, Brecksville, Ohio

[73] Assignee: The B. F. Goodrich Company, Akron, Ohio

[21] Appl. No.: 446,897

[22] Filed: Dec. 6, 1982

[51] Int. Cl.³ .......................... B05D 1/18; B05D 3/02
[52] U.S. Cl. .................................. 427/381; 156/334; 427/389.9; 427/412; 427/430.1; 525/203; 525/218; 525/227
[58] Field of Search ..................... 427/381, 389.9, 412, 427/430.1; 156/110 A, 334; 525/203, 218, 227

[56] References Cited

U.S. PATENT DOCUMENTS

| 3,833,688 | 9/1974 | Abolins et al. | 525/277 X |
| 3,833,689 | 9/1974 | Usamoto et al. | 525/227 X |
| 4,259,403 | 3/1981 | Tomlinson | 427/412 X |
| 4,400,486 | 8/1983 | Iwata et al. | 525/227 X |

*Primary Examiner*—Michael R. Lusignan
*Attorney, Agent, or Firm*—Harry F. Pepper, Jr,; Alfred D. Lobo

[57] ABSTRACT

Non-adhesive activated ("non-AA") polyester cord, or aramid cord, and fabrics made therefrom, may be coated in a two-step process, the first step of which is conventional. In the novel second step, after the cord is conventionally pre-coated in the first step, it is dipped in a R/F-free latex of a diene polymer in which an acrylic resin having a mol wt. in the range from about 100,000 to about 1,000,000 is dispersed. The acrylic resin resin is a copolymer selected from the group consisting of two or more monomers, one of which is (meth)acrylic acid and another is a lower alkyl(meth)acrylic acid ester, the monomers having the configuration

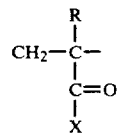

wherein, R represents H, methyl, ethyl, Cl or CN, and, X represents hydroxyl (OH), hydroxymethylamino (NHCH$_2$OH), or alkoxy (O-alkyl) having from 1 to 4 carbon atoms; and, optionally, in addition the copolymer may include a vinyl aromatic monomer having from 8 to about 18 carbon atoms.

8 Claims, No Drawings

TWO-STEP PROCESS FOR DIPPING TEXTILE CORD OR FABRIC AND RESORCINOL/FORMALDEHYDE-FREE COMPOSITION USED THEREIN

BACKGROUND OF THE INVENTION

For about the past nearly fifty years, it has been the practice to coat textile reinforcing elements such as cords and fabric (referred to herein as "cords" for simplicity) to be used in rubber goods, with an adhesive composition comprising an "adhesive rubber latex" consisting essentially of a phenol-formaldehyde resin, in which the phenol has almost always been resorcinol. This adhesive rubber latex is referred to as an "R/F/L" dip, for its three components namely, resorcinol, formaldehyde and latex. This dependence upon an R/F/L was attributed to the peculiar effectiveness of aromatic OH groups in formation of the R/F resin, as noted quite early by H. Moult in *Handbook of Adhesives*, Skeist, I., editor, at pg 495, published by Reinhold Publishing Corporation, New York, 1962; and even earlier, by vander Meer, *Rubber Chem. Techno.*, 18, 853 (1945); and by A. Greth, *Anger. Chem.* 51, 719 (1938).

Conventionally, a two-step process has been used, comprising dipping the cords in a first bath ("dip") of a first adhesive composition, drying and heat-setting the composition on the coated cords, then dipping the coated cords in a second dip comprising the R/F/L. Glass cords are usually precoated with an R/F/L by the manufacturer of the glass cords so that they need only be woven into fabric and used to reinforce goods such as automobile tires and hose.

Another method commonly used to prepare steel wire cord (brass-plated) for bonding to rubber is to generate the resin in situ in the vulcanized rubber matrix by incorporating therein a formaldehyde (or methylene) donor, for example hexamethylenetetramine, and a formaldehyde (or methylene) acceptor, typically resorcinol. This second method has no relevance to the preparation of textile cord, except for the remarkable fact that, despite the entirely different characteristics of textile cords, and steel wire, and glass cords, and the differences in the processes for bonding each of them to rubber, resorcinol is the common essential adhesive component.

With respect to reinforcing rubber goods with textile cords, a variety of filamentary textile materials, such as rayon, nylon, aramid and polyester fibers have been used. Polyester and aramid cords are frequently preferred because of their high strength and high modulus which are particularly advantageous in goods such as tires, hose and belts, but it has been found far more difficult to achieve adhesive bond strengths between polyester and rubber, or aramid and rubber, than between nylon and rubber.

The difficulty in bonding polyester cord to rubber is generally attributed to the presence of only hydroxyl (OH) and carboxyl (COOH) groups at the ends of the polyester molecules, while in nylon (for example) there is a relatively high frequency of amide (CONH) groups along the macromolecular chain. Aramid fibers are a special case which are not as satisfactorily coated as nylon, having instead, the adhesive characteristics of a polyester cord. Rayon and nylon are treated satisfactorily with a single step (single bath) coating of an aqueous dispersion of an RFL, and as a consequence, the process of this invention is only applicable to polyester and aramid cords, and most particularly to non-adhesive-activated ("non-AA") polyester cord.

Many adhesives and bonding systems ("dips") for synthetic linear polyester cords have been used. Most are cost-ineffective and additionally suffer from various other disadvantages such as toxicity in the case of of adhesives based on glycidyl ethers, or water-soluble phenolic condensates; and/or instability, as in the case of polyisocyanates, which has resulted in the use of water-insoluble reversibly blocked polyisocyanates (RBP) which, generally being solid, tend to precipitate in the baths in which the cord is dipcoated. An RBP is so termed because the reactive isocyanate (NCO) group is blocked against reaction at low temperature below about 400° F., and then the isocyanate is regenerated when the temperature is raised, usually above 400° F. but below about 500° F. The temperature at which a RBP will dissociate depends mostly on the blocking moiety (or substituting group).

Treatments which utilize phenol-blocked methylene-bis-(4-phenylisocyanate), and the like are disclosed in U.S. Pat. No. 3,307,966, and the use of phenol-aldehyde blocked polyisocyanates are disclosed in U.S. Pat. No. 3,226,276, inter alia. These treatments using an RBP necessarily require the use of plural dips, as does the process of this invention, or the adhesion is unacceptable. The first dip of this invention is conventionally used in the prior art.

In a typical two-step commercial process, polyester cord is dipped in a polyepoxide-containing first bath in which solid finely ground RBP is dispersed with the aid of a dispersing agent, excess RBP removed, the RBP-coated cord is dried at about 300° F., and then the dried polyester cord is heat-set at a temperature below about 500° F. If the cord is aramid cord, it is dipped in a first bath containing a polyepoxide and a curing agent, but no RBP. By "polyepoxide" I refer to a water-soluble epoxide having plural epoxide groups in a molecule. In a second bath, heat-set pre-coated cord is dipped in an R/F/L, excess R/F/L is removed, the cord dried at about 300° F., and heat-set at a temperature below about 500° F. so as to give excellent adhesion of the R/F/L to the pre-coated cord.

Though cord which has been properly coated with the aforedescribed prior art two-step process has excellent adhesion to rubber if it is immediately embedded in it, and cured (the rubber is vulcanized), the adhesion is poorer if the pretreated cord is exposed to the atmosphere and/or to sunlight. To combat this problem, I have disclosed in U.S. Pat. No. 3,968,295, the coating of an RBP-coated cord with a R/F/L in which is mixed an acrylic resin (interpolymer) such as is disclosed in U.S. Pat. No. 3,007,887, the disclosure of which is incorporated by reference thereto as if fully set forth herein. This interpolymer (copolymer) negates the degrading effects of the atmosphere and sunlight on the pretreated cords, serving an "anti-degradative" function in the R/F/L dip without adversely affecting the cords' excellent adhesion to cured rubber.

As the data in my U.S. Pat. No. 3,968,295 indicates, the pull-out force for cord treated in a two-step process, first with RBP, then with R/F/L in which is mixed the carboxylic acid ester copolymer, is essentially the same as that of rubber in which the same R/F/L dip is used without the copolymer. I had no reason to expect that this acrylic resin might have a unique effect, on a molecular scale, if the resorcinol (R) and formaldehyde (F)

components were simply left out of my prior art bath. Stated differently, it was surprising that the acrylic resin acted as the dominant adhesive, rather than as adhesion promoter if the R/F was left out of the second dip, to such an extent that it provided excellent adhesion. By "excellent adhesion" I infer that, in standard "180° peel adhesion" or "H-pull" tests, the surface of the stripped or pulled out cord is substantially completely coated with rubber, which is characteristic of "cohesive failure".

To avoid the operating inconveniences of a two-step process such as solid RBP setting out in the first bath, contamination of the second bath, and the like, and in addition, to save on operating costs, it is desirable to provide a one-step process for coating polyester and aramid cord with a combination of the RBP and the R/F/L in a single bath without deleteriously affecting the properties of the coated and heat-set cord, and without destroying the useful life of the bath. I have provided such a one-step process in my copending patent application Ser. No. 420,548 in which I utilize certain acrylic resins to promote adhesion. I was thus surprised to find that the RF components could be dispensed with if the appropriate concentration of particular acrylic resins, produced as emulsions, was dispersed in a conventional vinyl pyridine rubber latex.

It should be recognized that any conventionally used diene polymer latex is itself an adhesive in the sense that it bonds well to natural or synthetic rubber, but the latex does not bond to the cords' surface. This is evident from a standard H-pull test in which the cord pulled out is clean, that is, has little or no latex rubber adhering to it. Thus, the context of the latex's function in bonding reinforcing cords to rubber, the latex, by itself, is generally recognized as having no significant adhesive function.

The effectiveness of various acrylic resins as components of adhesive compositions has been long known, but it is also well known that the effectiveness of each acrylic resin depends upon the other components of the system. For example, U.S. Pat. No. 3,407,092 teaches a two-step process for coating nylon filaments, during the first step of which process an aqueous dispersion or emulsion of an acrylic copolymer is deposited, and in the second step of which process, cords made from the filaments are coated with a conventional R/F/L dip.

Soon thereafter, U.S. Pat. No. 3,483,075 disclosed an adhesive for any tire cord which adhesive was a mixture of a copolymer of methyl acrylate, (a) a monoester of a monoethylenically unsaturated dicarboxylic acid, and a monoethylenically unsaturated hydroxyl-group containing monomeric material, and (b) an R/F/L. Thus both references taught that, whatever the differences in the acrylic resin used may be, or the particular type of cord on which the adhesive compositions are used, the R/F/L is indispensable.

SUMMARY OF THE INVENTION

It has been discovered that non-adhesive activated ("non-AA") polyester cord, aramid cord, and fabrics made therefrom, may be coated in a two-step process, the first step of which uses an aqueous solution of an epoxide if the cord is an aramid, or an aqueous solution of an epoxide in which is dispersed a conventional RBP, if the cord is a polyester. In the novel second step, after the cord is conventionally pre-coated in the first step, it is dipped in a R/F-free latex of a diene polymer in which an acrylic resin having a mol wt in the range from about 100,000 to about 1,000,000 is dispersed. The acrylic resin is a copolymer selected from the group consisting of two or more monomers, one of which is (meth)acrylic acid and another is a lower alkyl(meth)acrylic acid ester, the monomers having the configuration

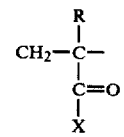

wherein, R represents H, methyl, ethyl, Cl or CN, and, X represents hydroxyl (OH), hydroxymethylamino (NHCH$_2$OH), or alkoxy (O-alkyl) having from 1 to 4 carbon atoms; and, optionally, in addition the copolymer may include a vinyl aromatic monomer having from 8 to about 18 carbon atoms.

It has more specifically been discovered that cohesive failure is obtained in rubber goods reinforced with non-AA polyester cord, which has been pre-coated with an aqueous epoxide solution containing from about 0.5 to about 5 parts by wt epoxide per 100 parts of water, and also an RBP, then dried and heat-set; and then, in a second step, the dried and heat-set cord is dipped in a second bath comprising a diene polymer latex and a copolymer (referred to herein as an "acrylic resin"), of a lower acrylic acid ester or methacrylic acid ester (hereafter together referred to as "(meth)acrylic acid ester") and one or more monomers selected from the group consisting of (meth)acrylic acid and N-methylol (meth)acrylamide, and again dried and heat-set. The acrylic resin functions as the essential adhesive component of the second bath which contains no resorcinol or formaldehyde.

It is therefore a general object of this invention to provide a bath composition ("second-step dip") for coating a cord or fabric made from non-AA polyester cord precoated with a RBP, comprising, a latex of a diene polymer in which is dispersed a copolymer of (meth)acrylic acid and/or N-methylol (meth)acrylamide, with a lower (meth)acrylic acid ester. The second-step dip contains from about 2 to about 10 parts by weight (by wt) of latex solids per part of acrylic resin solids. When an aramid cord is used, it is precoated only with an epoxide, the RBP being omitted. When an adhesive activated polyester cord is used, such as is commercially available as polyester cord which is pre-coated with an epoxide, the two step process of this invention fails to provide cohesive failure of vulcanized rubber goods reinforced with the AA cord.

It is a specific object of this invention to provide a second-step dip for coating pre-coated cord or fabric made from non-AA polyester with an adhesive consisting essentially of a mixture of (a) an emulsion of a diene polymer latex, with (b) an emulsion of a copolymer of (meth)acrylic acid, a lower alkyl (meth)acrylic acid ester, and styrene optionally with N-methylol (meth)acrylamide, (a specific embodiment of an acrylic resin) having a mol wt in the range from about 100,000 to about 1,000,000. The ratio of latex to acrylic resin is in the range from about 2:1 to about 10:1 parts by wt of latex solids to acrylic resin solids. The polyester cord is pre-coated in a first dip with an aqueous solution of an epoxide and an RBP formed by preliminarily reversibly blocking (coupling or substituting) an aromatic polyisocyanate with a compound capable of an addition reaction with it. The RBP is unblocked at a temperature above about 300° F. but below a temperature deleterious to the tensile strength of the AA polyester cord. Quite unexpectedly, the second-step R/F free dip with which the pre-coated cord is coated, is so effective with non-AA polyester cord that vulcanized rubber samples in which double-dipped, dried and heat-set cord is embedded, fail in cohesive failure.

DETAILED DESCRIPTION OF PREFERRED EMBODIMENTS

According to a preferred aspect of this invention a non-adhesive-activated (AA) polyester cord, or an aramid cord, is pretreated by the process of the invention in a two-step process, first with an epoxide-and-RBP containing dip if the cord is polyester, or with epoxide if the cord is aramid, then with a mixture of emulsions of a rubber latex, and of an acrylic resin ("rubber latex-acrylic resin emulsion") in a second dip.

The term "polyester" means highly homopolymeric or copolymeric linear ester derived from one or more dicarboxylic acids or ester forming derivatives thereof polycondensed with one or more glycols of the series $HO(CH_2)_nOH$, where n is greater than 1 but not exceeding 10, and glycol ethers derived therefrom. The phrase "highly polymeric linear esters" means polyesters which may be drawn to a state of molecular orientation as shown by characteristic X-ray patterns. A preferred acid is terephthalic acid. Examples of ester-forming derivatives of terephthalic acid are its aliphatic (including cycloaliphatic) and aryl esters and half-esters, its acid halides and its ammonium and amine salts. Examples of the said glycols are ethylene, trimethylene, tetramethylene, hexamethylene and decamethylene glycols. The preferred polyester for purposes of this invention is polyethylene terephthalate or a polyester comprising at least 95% by weight of polyethylene terephthalate but the process of this invention may be used with any highly linear polyester provided it is not adhesive-activated (non-AA). By non-AA polyesters I refer to commercially available polyester cords such as those available from Celanese Corp. as T-800 and T-900.

The term "aramid" means certain aromatic polyamides such as poly(p-phenylene terephthalamide), also referred to as PPD-T, and the like which are described in U.S. Pat. Nos. 3,869,429 and 3,869,430, and commercially available under the trademark Kevlar from the DuPont Company. The disclosures of the aforementioned U.S. Pat. Nos. 3,869,429 and 3,869,430 are incorporated by reference thereto as if fully set forth herein.

The RBP may be any reversibly blocked (substituted) polyisocyanate (RBP) in which the substituent contains an active hydrogen atom. Though such active H-containing compounds include water, amines, alcohols, organic acids, phenols, amides, anhydrides, halogen acids, potassium hydroxide, ammonia, sodium bisulfite, Grignard reagents, inter alia, preferred are the phenols and amides.

Any of the well-known polyisocyanates may be used in making the RBP, including triphenyl methane-triisocyanate, 2,4-toluene-diisocyanate, hexamethylene-diisocyanate, and the like. As is well known, such RBPs are particularly effective in combination with an R/F/L adhesive containing a rubber latex, when the RBP is heated to regenerate the polyisocyanate and the phenolic resin.

Preferred phenol blocking agents used to block the polyisocyanate are the monohydroxy benzenes, particularly if they are suitably substituted. Such substituted monohydroxy benzenes include o-chlorophenol, p-chlorophenol, o-bromophenol, p-bromophenol, o-cresol, p-cresol, 3,4-dichlorophenol, p-tertiary butyl phenol, and 2,5-dimethyl phenol.

More preferred blocking agents used to block the polyisocyanate, are amides, most preferred of which are lactams such as 2-pyrrolidone, 2-piperidone, caprolactam (6-amino-hexanoic acid lactam), and the like.

A lactam-blocked polyisocyanate is made by reacting a lactam with a polyisocyanate to form a temporary blocking of the polyisocyanate reactivity with water at temperatures at least below 212° F., and also to ensure the production of a resin that is chemically reactive as an adhesive component in a dip.

Those skilled in the art will recognize that it is critical that the RBP be unblocked at some temperature below that which is deleterious to the physical properties of the cord to which the adhesive is applied. As is also well known, the effectiveness of the isocyanate is assumed to derive from the reactivity of the isocyanate group with hydroxyls from the phenol, or the amide group of the lactams.

It is essential that, for best results, and specifically to obtain cohesive failure in reinforced rubber goods made with a high quality rubber compound, that the solid RBP be ground so finely that a majority of the primary particles are smaller than about 3 microns in average diameter. Presently available finely ground RBPs have a majority of their primary particles greater than 1 micron, and typically more than 80 percent are about 2 microns, and such RBPs when used in a dispersion, with conventionally used dispersing agents and surfactants (referred to herein as "hydrocarbyl dispersers"), will provide reinforced rubber goods which are likely to fail in cohesive failure.

The hydrocarbyl "disperser" used herein has the dual function of wetting the RBP particles and of keeping them in suspension. Despite the relatively small size of the RBP particles, they will settle in a bath unless continuously agitated. Of course when no RBP particles are used, as when an aramid cord is coated with epoxide solution, no hydrocarbyl disperser is generally necessary. When the disperser is used, the amount is sufficient to keep the RBP in suspension, substantially homogeneously dispersed in the bath. By "homogeneously dispersed" I mean that the concentration of RBP solids does not vary more than about 10% in the bath. By "hydrocarbyl" I refer to compounds containing predominantly C, H and O in their molecules.

In general, the amount of dispersing agent added is less than about 25 parts by wt per 100 parts of RBP, and more preferably is less than 10 parts by wt per 100 parts of RBP. Preferred dispersing agents are hydroxyl-terminated polyalkylene oxides such as the polyoxyethylenes having a mol wt in the range from about 200 to about 6000 available under the Carbowax and Polyox brands; polymeric carboxylic acids, particularly the copolymers of carboxylic acids and formaldehyde available under the Tamol brand; and polyhydric alcohols having a mol wt of from about 8,000 to about 750,000. Most preferred is Aerosol OT, commercially available from American Cyanamid Co., which functions both as a suspension agent and emulsifier.

The epoxide, RBP and hydrocarbyl disperser are combined in the first bath, if the cord being treated is polyester. If the cord is aramid, only the epoxide with a suitable curing agent is used. Typically, the curing agent is added in the bath, though as an alternative, the curing agent may be included in the second bath if the curing agent will not adversely affect the acrylic resin or rubber latex, or their interaction to provide cohesive failure in vulcanized rubber goods.

Suitable epoxides may be aliphatic, cycloaliphatic, aromatic or heterocyclic glycidyl ethers, or an aromatic glycidyl ester, which may be substituted if desired, with various substituents, for example halogen atoms, hydroxy groups, and ether radicals. Typically, preferred epoxides have an epoxy equivalent in the range from about 100 to about 200. Epoxides with higher epoxy equivalents are insoluble in water, difficult to emulsify, and difficult to controlledly coat the surface of the cords, all of which is well known in the art, and no claim is made to the composition of a first bath in the two-step process of this invention.

The latex component in the rubber latex-acrylic resin emulsion second dip should not be considered as being limited to any specific type of natural rubber latex, but rather to include all of those comparable diene polymer latex compositions commonly employed in the rubber fabricating industry. It is preferred however, that the latex contain at least some vinyl pyridine latex. This well-known type of latex is formed as an emulsion from butadiene, styrene, and vinyl pyridine monomers, usually in about a 70/15/15 by weight ratio.

The acrylic resin component of the second dip is among those disclosed in the U.S. Pat. No. 3,007,887. The acrylic resin has been used fo a variety of purposes such as in paper coating, textile printing, and baking enamels. This acrylic resin is made by known emulsion polymerization techniques predominantly from acrylic or substituted acrylic esters such as ethyl acrylate, methyl methacrylate, or any of a number of homologous or analogous compounds such as methyl acrylate, propyl acrylate, butyl acrylate, ethyl methacrylate, butyl methacrylate, ethyl 2-chloroacrylate, ethyl 2-cyanoacrylate, or mixtures of such esters. A second essential ingredient of the copolymer is acrylic acid or a homologue such as methacrylic acid.

Optionally, a vinyl aromatic monomer, such as styrene, and/or an acrylic amide such as acrylamide or N-methylol acrylamide or homologues or analogues of them may also be present. If an amide is used, it is in a minor proportion in the copolymer relative to the amount of ester, preferably in a quantity equivalent to the amount of (meth)acrylic acid, so as to assure essentially complete conversion of carboxyl groups to neutral or unreactive groups during heat-setting the coated cord. If desired, small proportions of other copolymerizable monomers may also be incorporated in the copolymer, such as vinyl acetate or acrylonitrile.

A preferred acrylic resin comprises a copolymer of acrylic acid or methacrylic acid with a lower alkyl methacrylate in which the latter is present in a major amount by wt, optionally with one or more monomers selected from the group consisting of an alpha-beta olefinically unsaturated carboxylic acid amide having a terminal $CH_2=C<$ group and from 4 to 5 carbon atoms, and a vinyl aromatic monomer having from 8 to about 18 carbon atoms.

Most preferred is an acrylic resin which is a carboxylic acid ester copolymer comprising (meth)acrylic acid, a lower alkyl methacrylic acid ester, and, styrene. In this most preferred acrylic resin, the (meth)acrylic acid is present in a minor amount relative to the lower alkyl methacrylic acid ester; and, styrene is present in an amount in the range from about 0.25 to about 1.25 parts of styrene per part of lower alkyl methacrylic acid ester.

Though the molecular weight (mol wt) of the particular acrylic resin chosen to make the emulsion is not critical, the mol wt should not be so high that an unstable emulsion results. Preferred acrylic resins are those which have a mol wt in the range from about 100,000 to about 1,000,000, measured by standard gel permeation chromatographic (GPC) techniques, but most preferred are those in the range from about 200,000 to about 400,000 which include links of a (lower alkyl) acrylate such as methyl acrylate or ethyl acrylate, and optionally styrene.

The acrylic resin and rubber latex admixed in the second bath, is usually applied by dipping and squeezing to remove excess bath solution and evenly distributing the acrylic resin-latex on the pre-coated polyester surface. Padding or spraying or other techniques known in the art for applying a bath solution to fibres may also be employed. For tire and conveyor belt cords, the pick-up of admixture of acrylic resin and rubber latex is preferably about 0.5 to 20% (solids), more preferably about 2 to 8% by weight.

Preferably the coated materials are then dried and the coating cured at about 150° C. to 250° C., and preferably about 175° C. to 230° C. for from 30 sec to 10 min, depending on the curing temperature, and preferably about 1 to 4 min. A curing temperature close to a softening temperature of the polyester material is preferred. An excessively high curing temperature can readily be detected by the fusing of fibres to produce stiff, relatively inflexible products. If desired, a second coating of either the second dip alone, or both the first and second dips, may be applied, if sufficient solids are not picked up by the cords in either the first or the second dips.

The second-dip of this invention gives equally good results when applied to the aforespecified types of cords whether the dip is used to coat fabric for braided hose or helically reinforced hose, or applied to woven fabrics such as are used in certain types of belting and many other reinforced rubber products. The dip composition is typically applied to a cord by feeding it under tension through a dip bath, removing excess dip, passing the dip-coated cord through a drying zone at a temperature in the range from about 200° F. to about 350° F. to dry it under tension, and thereafter heating it further in a range, normally referred to as a heat-setting temperature range, from about 350° F. but below about 500° F., to complete the adhesion of the dip to the cord. Such treatment of cord may be done with individual cords or to woven fabrics. After the heat setting of the cords, they may be stored prior to being used.

The synthetic latex used in the following examples is the same as the commercial material made from about 70% butadiene, 20% styrene, and 10% vinyl pyridine as the latex used in my U.S. Pat. No. 3,968,295, for consistency. The acrylic resin is a copolymer of acrylic acid, methyl methacrylate and styrene, optionally with acrylamide, or N-methylol acrylamide in an amount up to about 10% by weight of the acrylic resin.

EXAMPLE 1

A. First and second dips are prepared according to this invention, containing the following ingredients given in parts by weight, where non-AA polyester cord is to be coated:

|  | Wet wt. | Dry wt. |
|---|---|---|
| First Dip |  |  |
| Epoxide | 1.34 | 1.34 |
| RBP (20% solids dispersion)* | 18.30 | 3.66 |
| Water | 80.36 |  |
| Second Dip |  |  |
| Synthetic latex (40.3%) | 39.6 | 15.96 |
| Acrylic resin (20.5% solids) | 19.46 | 3.99 |
| NH$_4$OH (28%) | 8.0 |  |
| Water | 40.8 |  |

*caprolactam-blocked toluene diisocyanate

Since the RBP is normally solid, it has a proclivity to settle out in the first dip. To assist in keeping it dispersed, it is desirable to grind the RBP into particles smaller than about 25 microns, and preferably less than 15 microns with the majority of the particles being smaller than 2 microns. In addition, conventional dispersion agents and surfactants may be used as is commonly done in solids-containing baths to ensure as uniform a deposition of solids on the cord as possible.

The acrylic resin is an emulsion polymerized copolymer of 25% by wt acrylic acid, 37.5% by wt methyl methacrylate and 37.5% by wt styrene. The synthetic latex is a commercially available vinyl pyridine butadiene latex.

Tire cord made from two (2) non-AA T-800 polyethylene terephthalate yarns of 1000 denier each (referred to as "1000/2" cord), is dipped in the first dip, dried under tension at 250° F. for about 2 min., and heat-set at about 450° F. for 40 sec. The cord is then dipped in the second bath, again under tension, dried at 250° F. for about 2 min., then heat-set at about 420° F. for 40 sec., after which it is embedded in rubber and cured for H-pull tests.

The rubber stock is a conventional high-grade rubber stock such as is used on tires manufactured for original equipment on passenger automobiles, typically having the following composition:

| Ingredients | Parts (by wt) |
|---|---|
| Natural rubber | 100. |
| Zinc oxide | 3. |
| Carbon black | 30. |
| Stearic acid | 2. |
| Pine tar | 7.25 |
| Mercaptothiazole | 1.25 |
| Sulfur | 3. |
| Diphenylguanidine | 0.18 |
| Phenyl beta naphthylamine | 1. |

B. Control "A". For a first control, non-AA T-800 1000/2 tire cord from the same batch is dipped in the same first dip, dried and heat-set under identical conditions. The cord is then dipped in a second R/F/L bath formulated as follows:

|  | Wet wt | Dry wt |
|---|---|---|
| Part A |  |  |
| Resorcinol | 11.0 | 11.0 |
| Formaldehyde | 16.2 | 6.2 |
| Sodium hydroxide | 0.3 | 0.3 |
| Water | 238.5 |  |
| Part B |  |  |
| Synthetic latex (41%)* | 244. | 100. |
| Part A | 266 | 17.3 |
| Water | 60 |  |
| NH$_4$OH (28%) | 11.3 |  |

*commercially available Gen-Tac$^R$

C. Control "B". For a second control, non-AA T-800 1000/2 tire cord from the same batch is dipped in the same first dip as in 1A hereinbefore, dried and heat-set under identical conditions. The cord is then dipped in a second R/F/L bath containing an acrylic resin as set forth in Example 1 of my U.S. Pat. No. 3,968,295, the resin being a copolymer of 75% methyl methacrylate, 8% acrylic acid, and 17% N-methylol acrylamide. The second dip for this control B is formulated as follows:

|  | Wet wt | Dry wt |
|---|---|---|
| Part A |  |  |
| Synthetic latex | 195. | 74. |
| Water | 75. |  |
| Part B |  |  |
| Resorcinol-formaldehyde | 13. | 10. |
| NH$_4$OH | 30. |  |
| Sodium hydroxide | 15. |  |
| Acrylic resin | 45. | 11. |
| Part C |  |  |
| Formalin | 8. | 3. |
| Water | 18. |  |

The three parts are separately formulated, then part B is mixed into part A, and finally part C is mixed in. The mixture is allowed to stand 16 to 24 hours before use.

In each of the foregoing examples 1A–C, the pick-up in the first dip is about 1%, and in the second dip the pick-up is about 4%.

In each of the foregoing examples 1B and 1C, the control cords A and B are coated in the second dip, dried at about 250° F. for 2 min., and heat-set at about 420° F. for 40 sec., just as was done for cord in 1A, according to this invention.

Vulcanized samples were prepared in the usual manner at a temperature in the range of from about 300° F. to about 350° F. for about 30 min, keeping all conditions the same for each of the controls, and the cord treated according to the process of this invention. Adhesion between the cord and rubber was measured on each sample as prescribed in ASTM D-2138 H-pull test, the details of which are incorporated by reference thereto as if fully set forth herein.

The following static adhesion H-pull test results (avg. of 5 samples) given in pounds(lb), were obtained:

|  | Control A | Control B | This invention |
|---|---|---|---|
| Adhesion at room temp. | 29.9 | 29.8 | 31.0 |
| Adhesion after 24 hr at 212° F. | 23 | 21.9 | 24. |

In all cases the test results indicated cohesive failure as evidenced by substantially the entire surface of the pulled-out cord being covered with rubber, that is, at least 80% of the surface of the cord is covered with rubber.

In addition to the foregoing static adhesion H-pull tests, a series of dynamic adhesion tests were conducted on samples of controls A and B, along with samples prepared according to this invention. These dynamic adhesion tests were conducted as described in *Rubber-* to-Cord Dynamic Adhesion Test Development, Analysis and Applications, by Victor Kachem and S. J. Weaver, presented to the Rubber Division of the American Chemical Society in Minneapolis, 1976, and commonly known as the Ashland Dynamic Adhesion Test. For each of the samples, the following conditions were the same, and the values were as shown:

| Cord Load | 10.0 lb. |
|---|---|
| Compression Load | 150.0 lb. |
| Initial throw | 0.3 in. |
| Initial Deflection | 45–50% |

The following test results, which are the average of five samples, were obtained:

|  | Control A | Control B | This invention |
|---|---|---|---|
| Avg. run time, min. | 31.1 | 32.8 | 33.8 |
| Initial deflection, % | 50 | 49 | 51 |
| Final deflection | 50 | 49 | 51 |
| Surface temperature, °F. | 226 | 224 | 232 |

It is evident from the foregoing results that all samples were comparable in dynamic adhesion. In particular, the samples made with non-AA T-800 polyester cord according to this invention, showed essentially the same dynamic adhesion, within experimental error, as the controls A and B. Analogous results are obtained with 1W70 non-AA polyester cord obtained from Allied Chemical Co. The term "non-AA" is used herein in the usual sense to identify a cord which is not coated with a purportedly epoxide "activating" coating, but may be coated with a "non-activating" coating such as an antioxidant, lubricant, or antistatic composition.

On the other hand, for an as yet undetermined reason, 1000/2 T-811 AA polyester cord which is generally acknowledged to have an epoxide precoating on its surface, fails in adhesive failure in static adhesion tests, when coated as specified in the process of this invention, and its dynamic adhesion tests indicate significantly lower values so that they may not be said to be comparable to the values obtained hereinabove.

D. Fabric woven from T-800 1000/2 cord is treated as described in example 1A hereinabove, and the coated fabric used in samples which were vulcanized for peel adhesion tests made in accordance with the procedure set forth in ASTM D-413-76 which is incorporated by reference herein as if fully set forth. All the vulcanized samples failed in cohesive failure.

E. Another embodiment of the second dip was prepared as described in example 1A hereinabove, except using an acrylic resin which is an emulsion polymerized copolymer of 8% acrylic acid, 17% acrylamide and 75% methyl methacrylate. Cord coated with this second dip composition also yielded vulcanized samples which failed in cohesive failure. Analogous results were obtained when N-methylol acrylamide was substituted for acylamide.

F. Still another embodiment of the second dip was prepared as described in example 1A hereinabove, except using an acrylic resin which is an emulsion polymerized copolymer of a minor proportion by wt of acrylic resin and a major proportion of methyl methacrylate, the ratios ranging from 10 to about 37.5 parts of acrylic acid for from 90 to about 62.5 parts methyl methacrylate. Again vulcanized samples coated with this second dip failed in cohesive failure. Similar results were obtained when methacrylic acid is substituted for acrylic acid, and other lower alkyl (meth)acrylate esters are used.

EXAMPLE 2

A. Kevlar aramid cord is treated in a manner analogous to that described in example 1A hereinabove, except that the first dip contains no epoxide. Samples were prepared for H-pull tests, in the usual manner, and test results indicated that all samples prepared with aramid cord treated in the two-step process of this invention, failed in cohesive failure.

B. Fabric made from Kevlar aramid cord is coated in an epoxide-free first dip, and then with the second dip of this invention, as described hereinbefore, and used in samples for peel adhesion tests. All the samples failed in cohesive failure.

I claim:

1. A second-step dip for coating a cord or fabric made from non-adhesive-activated polyester, or aramid, comprising, an aqueous emulsion containing
   (a) an adhesive latex of a diene polymer free of resorcinol and formaldehyde, and,
   (b) an acrylic resin having a mol wt in the range from about 100,000 to about 1,000,000 selected from the group consisting of a copolymer of two or more monomers one of which is (meth)acrylic acid and another is a lower alkyl(meth)acrylic acid ester, the monomers having the configuration

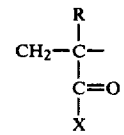

wherein, R represents H, methyl, ethyl, Cl or CN, and, X represents hydroxyl (OH), hydroxymethylamino (NHCH$_2$OH), or alkoxy (O-alkyl) having from 1 to 4 carbon atoms; and, optionally, in addition, the copolymer may include a vinyl aromatic monomer having from 8 to about 18 carbon atoms, wherein, the ratio of said latex to said acrylic resin is in the range from about 2:1 to about 10:1 parts by wt latex solids to acrylic resin solids.

2. The second-step dip of claim 1 wherein,
   said latex is in substantial part an emulsion of a polymer made predominantly from butadiene and to a minor extent, from styrene and vinyl pyridine,
   said acrylic resin is a carboxylic acid ester copolymer consisting essentially of a lower alkyl (meth)acrylic acid ester, (meth)acrylic acid, and an amide selected from the group consisting of acrylamide and N-methylol acrylamide, said (meth)acrylic acid being present in a minor amount relative to the lower alkyl (meth)acrylic acid ester, and, said amide being present in a minor amount relative to the lower alkyl (meth)acrylic acid ester.

3. The second-step dip of claim 1 wherein,
   said latex is in substantial part an emulsion of a polymer made predominantly from butadiene and to a minor extent, from styrene and vinyl pyridine,
   said acrylic resin is a carboxylic acid ester copolymer consisting essentially of a lower alkyl (meth)acrylic acid ester, (meth)acrylic acid, and styrene, said (meth)acrylic acid being present in a minor amount relative to the lower alkyl (meth)acrylic acid ester, and, said styrene being present in an amount in the range from about 0.25 to about 1.25 parts styrene per part of lower alkyl (meth)acrylic acid ester.

4. The second-step dip of claim 2 wherein,
said acrylic resin includes styrene which is present in an amount in the range from about 0.25 to about 1.25 parts styrene per part of lower alkyl (meth)acrylic acid ester.

5. In a two-step process for dipping non-adhesive activated polyester cord or fabric, or aramid cord or fabric, to coat it with a first adhesive from a first bath, and then with a second adhesive from a second bath in which second bath an acrylic resin is the essential adhesive component, the improvement in the second step comprising, (a) dipping said cord or fabric, after it is dipped, dried and heat-set from the first bath, in a second bath consisting essentially of an aqueous emulsion containing
  (i) an adhesive latex of a diene polymer free of resorcinol and formaldehyde, and,
  (ii) an acrylic resin having a mol wt in the range from about 100,000 to about 1,000,000 selected from the group consisting of a copolymer of two or more monomers one of which is (meth)acrylic acid and another is a lower alkyl(meth)acrylic acid ester, the monomers having the configuration

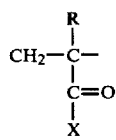

wherein, R represents H, methyl, ethyl, Cl or CN, and, X represents hydroxyl (OH), hydroxymethylamino (NHCH2OH), or alkoxy (O-alkyl) having from 1 to 4 carbon atoms; and, optionally, in addition, said copolymer may include a vinyl aromatic monomer having from 8 to about 18 carbon atoms, (b) drying the cord or fabric at a temperature in the range from above about 200° F. but below a temperature deleterious to the cord or fabric, under tension for from 30 sec to about 10 min., and, (c) heat-setting the cord or fabric with the dried second dip at a temperature in the range from above about 350° F. but below a temperature deleterious to the cord or fabric, for from about 30 sec to about 10 min, so as to complete the adhesion of the second-step dip to said cord or fabric, wherein, the ratio of said latex to said acrylic resin is in the range from about 2:1 to about 10:1 parts by wt latex solids to acrylic resin solids.

6. The process of claim 5 wherein,
said latex is in substantial part an emulsion of a polymer made predominantly from butadiene and to a minor extent, from styrene and vinyl pyridine,
said acrylic resin is a carboxylic acid ester copolymer consisting essentially of a lower alkyl (meth)acrylic acid ester, (meth)acrylic acid, and an amide selected from the group consisting of acrylamide and N-methylol acrylamide, said (meth)acrylic acid being present in a minor amount relative to the lower alkyl (meth)acrylic acid ester, and, said amide being present in a minor amount relative to the lower alkyl (meth)acrylic acid ester.

7. The process of claim 5 wherein,
said latex is in substantial part an emulsion of a polymer made predominantly from butadiene and to a minor extent, from styrene and vinyl pyridine,
said acrylic resin is a carboxylic acid ester copolymer consisting essentially of a lower alkyl (meth)acrylic acid ester, (meth)acrylic acid, and styrene, said (meth)acrylic acid being present in a minor amount relative to the lower alkyl (meth)acrylic acid ester, and, said styrene being present in an amount in the range from about 0.25 to about 1.25 parts styrene per part of lower alkyl (meth)acrylic acid ester.

8. The process of claim 6 wherein,
said acrylic resin includes styrene which is present in an amount in the range from about 0.25 to about 1.25 parts styrene per part of lower alkyl (meth)acrylic acid ester.

* * * * *